United States Patent [19]

Ishiguro

[11] Patent Number: 5,124,682
[45] Date of Patent: Jun. 23, 1992

[54] DETECTING ELEMENT

[75] Inventor: Fujio Ishiguro, Nagoya, Japan

[73] Assignee: NGK Insulators, Ltd., Japan

[21] Appl. No.: 544,418

[22] Filed: Jun. 27, 1990

[30] Foreign Application Priority Data

Jun. 27, 1989 [JP] Japan .................... 1-162705

[51] Int. Cl.⁵ .............................. H01C 7/10
[52] U.S. Cl. ................................. 338/22 R
[58] Field of Search ............ 338/22 R, 225 D, 25, 338/23, 28; 374/183, 185, 208

[56] References Cited

U.S. PATENT DOCUMENTS 4,282,507  8/1981  Tindall et al. ............... 338/25
4,903,001  2/1990  Kikuchi ..................... 338/22 R Primary Examiner—Marvin M. Lateef
Attorney, Agent, or Firm—Parkhurst, Wendel & Rossi

[57] ABSTRACT

A detecting element including a substrate, an electrically conductive portion formed on a surface of the substrate, lead wires for connecting the electrically conductive portion with an external circuit, and a protective layer for covering the electrically conductive portion. The protective layer is made of at least an inorganic glass and a material having a heat conductivity greater than that of the inorganic glass.

8 Claims, 4 Drawing Sheets

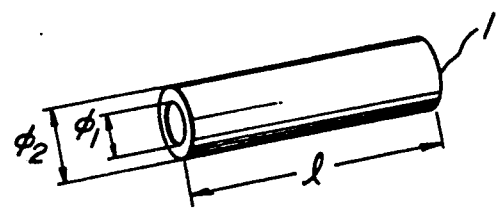
FIG_1a
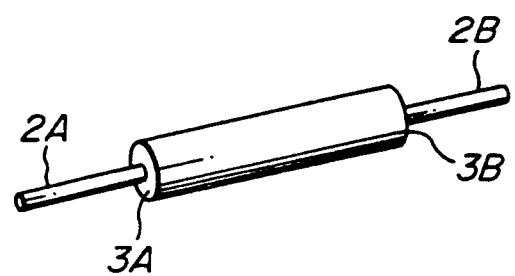
FIG_1b
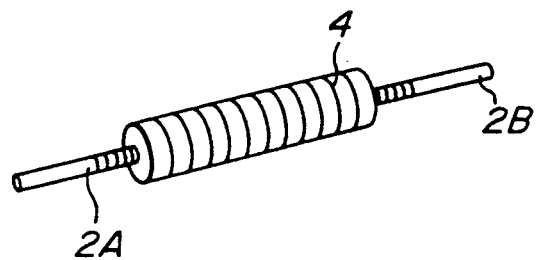
FIG_1c
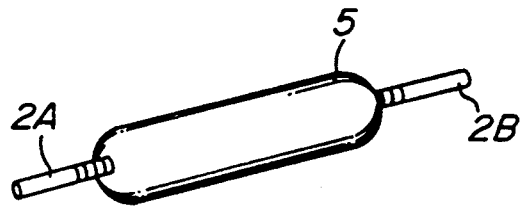
FIG_1d

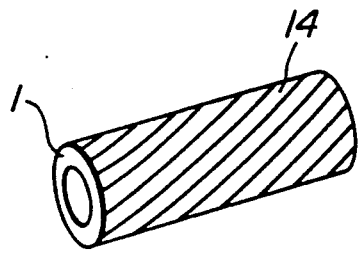
FIG._2a
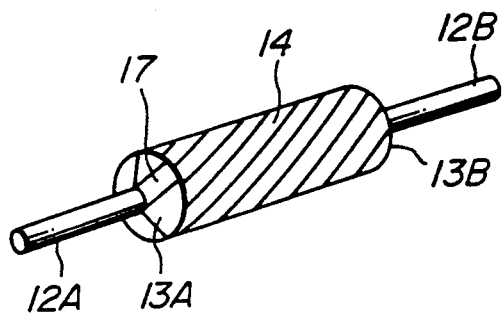
FIG._2b
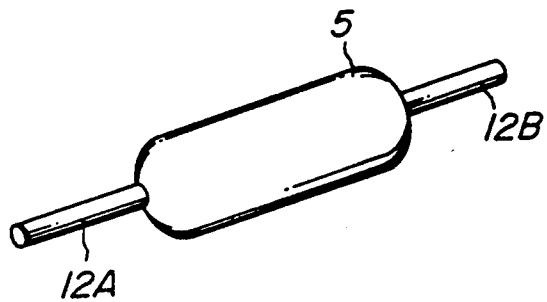
FIG._2c

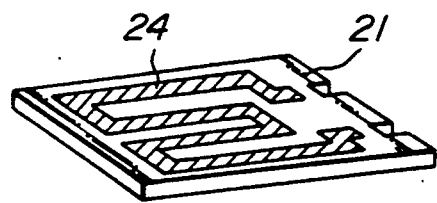
FIG_3a
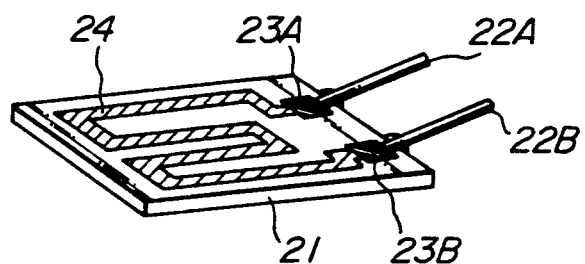
FIG_3b
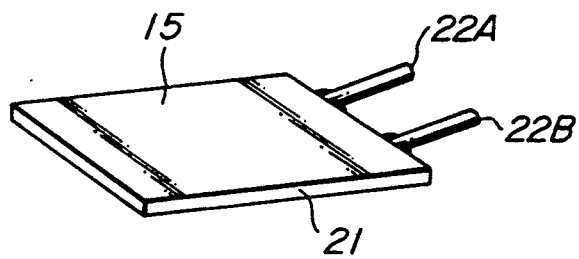
FIG_3c

FIG._4
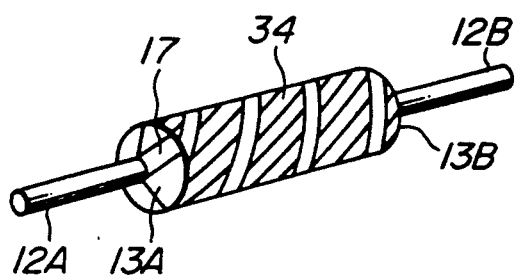
FIG._5
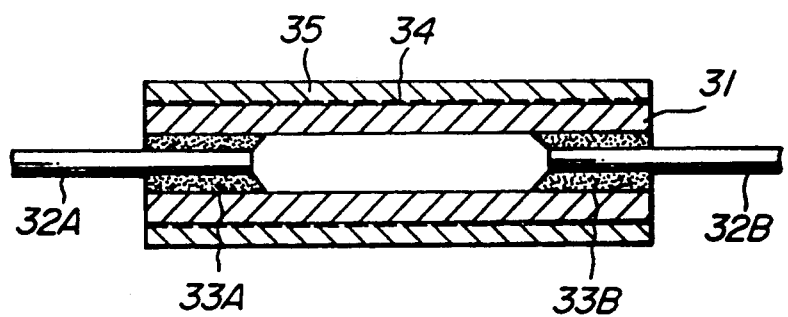

DETECTING ELEMENT

BACKGROUND OF THE INVENTION

1. Field of the Invention

The present invention relates to detecting elements for mainly measuring physical properties of fluids by utilizing conversion or transmission of heat.

2. Related Art Statement

For example, sensing detector elements are known to be used for measuring physical properties such as a flow amount, flow rate, temperature, etc. of intake air in internal combustion engines or the like.

One such detector element is shown in FIG. 5 for example. In this example, a Pt wire or a Pt film 34 is provided on the outer surface of a hollow pipe 31 made of a ceramic, and metallic lead wires 32A and 32B are fixed to opposed end openings of the hollow pipe 31 with a glass paste, a metallic paste, an organic adhesive or the like as denoted by 33A, 33B. An inorganic glass protective layer 35 is provided on the outer surfaces of the Pt wire or Pt film 34 and the hollow pipe 31.

This protective layer 35 is to prevent changes in resistance of the metallic resistor due to contamination with a fluid to be measured, and also to fix the metallic resistor to the surface of the hollow pipe. At the same time, when the surface of the protective layer is kept smooth, dust in the fluid to be measured is prevented from being attached and heaped up on the surface of the detecting element and sufficient strength is conferred upon the entire element. Therefore, the thickness of the protective layer must be greater than the su face roughness of the hollow pipe and the unevenness of the metallic resistor (wire, spiral thin layer or the like) so that influences of the surface roughness of the pipe and the unevenness of the metallic resistor upon the surface state of the protective layer may be controlled to a minimum and given smoothness may be maintained.

However, the above-mentioned detecting element utilizes heat exchange or heat transmission between the metallic resistor and the fluid to be measured. Therefore, if the thickness of the inorganic glass protective layer having great thermal insulation is increased as mentioned above, the heat transmission between the resistor and the fluid is interrupted, so that the response of the detecting element is remarkably lowered.

SUMMARY OF THE INVENTION

It is therefore an object of the present invention to provide a good response detecting element which can sufficiently maintain heat transmission between the resistor and the fluid, while preventing heaping of dust on the surface of the element and a reduction in strength of the element.

The present invention is characterized in that the detecting element comprises a substrate, an electrically conductive portion formed on a surface of the substrate lead wires electrically connecting the electrically conductive portion with an external circuit, and a protective layer for coating the electrically conductive portion, wherein the protective layer is made of at least an inorganic glass and a material having a heat conductivity greater than that of the inorganic glass.

As the inorganic glass, silicate glass, borosilicate glass, lead glass, quartz glass and the like may approximately be selected depending upon the intended use of the detecting element.

As the material having the heat conductivity higher than that of the inorganic glass selected as the protective layer, ceramics, metals, graphite and the like are preferred.

As the ceramics, use may be made of oxides, silicides of nitrides such as alumina, beryllia, magnesia, spinel, titania, calcia, thoria, mullite, zircon zirconia, aluminum nitride or the like. As the metals, use may be made of almost all metals stable at room temperature, for example, iron, copper, aluminum, nickel, chromium, tungsten, gold, silver, platinum, palladium, and the like.

These and other objects features, and advantages of the invention will be apparent upon reading the following description of the invention when taken in conjunction with the attached drawings, with the understanding that some modifications, variations and changes of the same could be made by a skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 1a, 1b, 1c and 1d are perspective views for illustrating steps for the production of a detecting element as an embodiment of the present invention;

FIGS. 2a, 2b and 2c are perspective views for illustrating steps for the production of another detecting element according to the present invention;

FIGS. 3a, 3b and 3c are perspective views for illustrating steps of the production of still another embodiment of the detecting element;

FIG. 4 is a perspective view for illustrating a further detecting element before a protective layer is formed; and FIG. 5 is a sectional view of the conventional detecting element.

DETAILED DESCRIPTION OF THE INVENTION

FIGS. 1a and 1d are the perspective views for illustrating the detecting element during production steps thereof.

In this embodiment, as shown in FIG. 1b, leads 2A and 2B made of a NiFe (or Pt-Rh) alloy are inserted into opposite hollow end spaces of a substrate made of a cylindrical alumina pipe 1 in FIG. 1a, respectively. Glass paste is applied between the alumina pipe 1 and the leads 2A and 2B, which is fired in a heating kiln to form fired portions 3A and 3B. Next, as shown in FIG. 1c, a platinum wire 4 having a diameter (for example, 20 $\mu$m is diameter) smaller than that of the leads 2A and 2B is spirally wound around the alumina pipe 1, starting at lead 2A and ending up at the lead 2B. Lastly, a detecting element is obtained by forming a protective layer 5 around the surface of the alumina pipe and the protective layer 5 as shown in FIG. 1d.

The above construction is characterized in that the protective layer 5 is made of an inorganic glass and a material having a heat conductivity greater than that of the inorganic glass.

That is, if the protective layer 5 is made of inorganic glass only, the platinum wire 4 as a resistor or an electric conductor is airtightly obstructed from a fluid to be measured. Then the platinum wire 4 is more durable and the smoothness of the surface of the protective layer 5 prevents dust from being heaped thereto. However, heat exchange between the platinum wire 4 and a fluid to be measured is interrupted to deteriorate response. In, the above embodiment, the heat conductivity of the protective layer 5 is increased by the material having the heat conductivity greater than that of the inorganic glass, for example, a ceramic or a metal as mentioned above. Therefore, heat exchange between the platinum wire 4 and the fluid to be measured is smoothly, rapidly effected without decreasing the thickness of the protective layer 5. Accordingly, since the resistance of the platinum wire 4 is rapidly varied, the response of the detecting element is improved. In addition, since it is not necessary to make the protective layer 5 thinner, the thickness of the protective layer 5 can be maintained at such a level so as not allow the influence of the unevenness due to the platinum wire 4 to appear on the surface of the protective layer 5. Consequently, dust will not heap on the surface of the protective layer, and the strength of the element can be maintained to a high level by the protective layer 5.

In order to form the protective layer 5 in this embodiment, for example, an organic binder, and an inorganic or organic solvent are mixed and kneaded by a kneader such as a roll mill or a sand mill, to which a solvent is added to adjust the mixture to a given viscosity as a paint. The platinum wire-wound alumina pipe in FIG. 1c is coated with this paint by dip coating (immersion-coating), blade coating, spray coating, spiral coating, brush coating or the like, which may be then be thermally treated at a high enough temperature to smoothen the surface of the protective layer 5. A film of the material (the inorganic glass and the metal and/or the ceramic) may be formed by RF (radio frequency) sputtering. Further, a known electric insulating film-forming process such as a sol-gel process or CVD process may be employed.

The ratio between the inorganic glass and the material having the heat conductivity higher than that of the inorganic glass in the protective layer 5 is preferably 50/50 to 90/10 in the case of inorganic glass/metal and 30/70 to 90/10 in the case of inorganic glass/ceramic in terms of volume ratio.

The thickness of the protective layer 5 is preferably 14–50 μm.

FIGS. 2a through 2c are perspective views for illustrating the producing step of another embodiment of the detecting element.

In this embodiment, as shown in FIG. 2a, a platinum film 14 is provided on a substrate made of a cylindrical alumina pipe 1 by sputtering or vapor deposition. Next, as shown in FIG. 2b, leads 12A and 12B made of stainless steel (or Pt-Rh) or the like are inserted into opposite inner side ends of the alumina pipe 1 and glass paste is filled between the aluminum pipe 1 and the leads 12A and 12B, which is fired in a heating kiln to form fired portions 13A and 13B (It may be that the leads 12A and 12B are fixed to the opposite ends of the alumina pipe 1 on the inner diameter side, and then platinum film 14 is formed). Next, platinum paste is formed between the platinum film 14 and the leads 12A and 12B, which is fired at a given temperature to form conductive portions 17 so that electrical conduction is effected among the lead 12A, the platinum film 14, and the lead 12B. Further, instead of conductive portions 17, the fired portions 13A and 13B may be formed by filling a mixed paste of glass and platinum between the alumina pipe 1 and the leads 12A and 12B and then firing it. Finally, as shown in FIG. 2c, the detecting element is obtained by forming the protective layer 5 over the platinum film 14, and the fired portions 13A and 13B. The protective layer 5 has the same construction as that in FIG. 1.

FIGS. 3a through 3c are perspective views for illustrating still another embodiment of a planar detecting element through production steps thereof.

In this embodiment, as first shown in FIG. 3a, a platinum-rhodium alloy film 24 is formed on a substrate made of a planar beryllia plate 21 by sputtering, and then a given pattern is formed by etching after sputtering. Next, as shown in FIG. 3b, nickel leads 22A and 22B are fixed to the platinum-rhodium alloy film near opposite ends with glass, and a platinum paste is applied between the alloy film 24 and the nickel leads 22A and 22B, which is fired in the heating kiln to form fired films 23A and 23B, respectively. Finally, as shown in FIG. 3c, a detecting element is obtained by forming the similar protective layer 15 as mentioned above over the entire surface of the beryllia plate 21.

In the embodiment of FIG. 2, the platinum film 14 is formed over the entire outer periphery of the alumina pipe 1. However, as shown in FIG. 4, the platinum film 14 can be trimmed with a laser beam to form a spiral platinum film 34 a protective layer 5 is formed as shown in FIG. 2c.

In the following, more concrete experimental examples will be explained.

Detecting elements shown in FIGS. 1 and 2 were each produced by using an alumina pipe as a substrate. The dimensions of the alumina pipe are $\phi_1 = 0.2$ mm, $\phi_2 = 0.5$ mm and $l = 2$ mm in FIG. 1a. The average surface roughness of the alumina pipe was determined by observing a crosssection of the alumina pipe with a scanning type electron microscope (the roughness was 10–30 μm in these examples).

Next, platinum-rhodium alloy wires having an outer diameter of 0.15 mm were fixed to the inner side of the alumina pipe at a firing temperature of 900° C. as lead wires.

Then, a platinum wire having a diameter of 20 μm was wound around the outer surface of the alumina pipe to adjust resistance to 20 Ω (FIG. 1c). Further, in another embodiment, a platinum film was thinly vapor deposited all over the entire outer surface of the alumina pipe, and was electrically connected with the lead wires by means of a platinum paste to adjust the resistance between the lead wires to 20 Ω (FIG. 2b).

Next, a protective layer containing an inorganic glass and ceramic and/or a metal powder at a volume ratio given in Table 1 was formed in a film thickness of 50–60 μm (FIG. 1d and FIG. 2c).

A paint for a protective layer was formed by mixing the inorganic glass with a ceramic or metal powder and ethylcellulose, which volume is 1/10 of an amount of the glass, ceramic and/or the metal powder, adding terpinol as a solvent thereto, fully kneading the mixture by a grinding mill and a kneader and then a tri-roll mill, and adding terpinol thereto for attaining a viscosity suitable for dip coating.

Each of the samples in FIGS. 1c and 2b was coated with the paint by dip coating, which was thermally treated to make the surface of the protective layer sufficiently smooth.

With respect to Comparative Examples F and G, neither metal nor ceramic powder was added to the protective layer (Conventional examples).

With respect to each of the above samples, response time was measured, the results being shown in the following Table 1.

In Table 1, the glass-firing temperature means a temperature required to make the surface of the protective layer sufficiently smooth. The diameter of the ceramic or the metal means the average grain diameter determined by a scanning type electron microscope, which was an average of measurement values of diameters (widths) of fifty grains as measured in a given direction.

The response time means a time period required for a given change in resistance of the resistor when the temperature of air as a gas to be measured was changed from 25° C. to 70° C. while the flow rate of air was set at 30 kg/hour. More specifically, the resistances $R_{25}$ and $R_{70}$ were set at 20 Ω and a constant value at temperatures of 25° C. and 70° C., respectively, and a difference between $R_{70}$ and $R_{25}$ was taken as $\Delta R$. In that case, a lapse of time when the resistance $R_{25}$ changed by $0.8 \times \Delta R$ from a point of time when the temperature was changed from 25° C. to 70° C. was taken as the response time (which was the average of five measurements).

From the above results, it is clearly seen that the response time is conspicuously shortened in both of the detecting elements shown in FIGS. 1 and 2 according to the present invention.

As a matter of course, various modifications can be made on the above examples.

For example, the materials of the substrate, the lead wire, the resistor wire, and the resistive film may variously be varied.

Further, it may be that two or more kinds of ceramics and/or two or more kinds of metals are incorporated into the protective layer. Further, a powdery alloy composed of two or more kinds of metals may be contained in the protective layer.

The electric conductor may be made of Pt, Ni, Rh, Pd or an alloy thereof. The shape of the substrate may be cylindrical shape, quadrangular prism, or hexagonal prism. The material of the substrate may be selected from mullite, zirconia, quartz or the like besides alumina.

According to the detecting element of the present invention, since the protective layer is constituted by at least the inorganic glass and the material having the heat conductivity higher than that of the inorganic glass, the heat conductivity of the protective layer is increased by this material. Consequently, heat exchange between the electrical conductor and the fluid to be measured is smoothly and rapidly effected without decreasing the thickness of the protective layer. Therefore, since the resistance of the electric conductor rapidly varies, the response of the detecting element can remarkably be improved. In addition, the thickness of the protective layer need not be decreased to enhance the heat conductivity. As a result, since the given thickness of the protective layer may be maintained, it is possible to prevent the phenomena that unevenness of the surface roughness of the substrate and the electric conductor appears on the surface of the protective layer and accordingly dust in the fluid heap thereon. Moreover, the strength of the element can be increased.

What is claimed is:

1. A detecting element comprising a substrate, an electrically conductive portion formed on a surface of the substrate, lead wires connecting the electrically conductive portion to an external circuit, and a non-homogeneous protective layer covering the electrically conductive portion, wherein the protective layer comprises (a) an inorganic glass and (b) a second discrete material having a heat conductivity greater than the heat conductivity of the inorganic glass.

2. The detecting element of claim 1, wherein the inorganic glass is selected from the group consisting of silicate glass, borosilicate glass, lead glass and quartz glass.

3. The detecting element 1, wherein the material is selected from the group consisting of ceramics, metals and graphite.

4. The detecting element of claim 3, wherein the ceramics are selected from the group of oxides, silicides or nitrides consisting of alumina, beryllia, magnesia, spinel, titania, calcia, thoria, mullite, zircon, aluminum nitride and zirconia, and the metals are selected from the group consisting of iron, copper, aluminum, nickel, chromium, tungsten, gold, silver, platinum, and palladium.

5. The detecting element of claim 3, wherein a ratio of the inorganic glass/the metals is 50/50-90/10, and a ratio of the inorganic glass/the ceramics is 30/70-90/10.

6. The detecting element of claim 1, wherein the substrate has a hollow pipe shape, and the electrically conductive portion is formed on an outer peripheral surface of the substrate.

7. The detecting element of claim 1, wherein the substrate has a planar shape.

8. The detecting element of claim 1, wherein the material having a heat conductivity greater than the heat conductivity of the inorganic glass is not less than 20% by volume of said protective layer.

* * * * *